United States Patent
Rock

[11] Patent Number: 6,099,984
[45] Date of Patent: Aug. 8, 2000

[54] MIRRORED SERPENTINE FLOW CHANNELS FOR FUEL CELL

[75] Inventor: Jeffrey Allan Rock, Rochester, N.Y.

[73] Assignee: General Motors Corporation, Detroit, Mich.

[21] Appl. No.: 09/016,127

[22] Filed: Jan. 30, 1998

Related U.S. Application Data

[63] Continuation-in-part of application No. 08/990,642, Dec. 15, 1997, abandoned.

[51] Int. Cl.[7] .............................. H01M 8/04; H01M 8/02
[52] U.S. Cl. .................................... 429/39; 429/30
[58] Field of Search ................... 429/30, 34, 38, 429/39

[56] References Cited

U.S. PATENT DOCUMENTS

| | | | |
|---|---|---|---|
| 5,108,849 | 4/1992 | Watkins et al. | 429/30 |
| 5,300,370 | 4/1994 | Washington et al. | 429/34 |
| 5,514,487 | 5/1996 | Washington et al. | 429/39 |
| 5,686,199 | 11/1997 | Cavalca et al. | 429/30 |
| 5,776,624 | 7/1998 | Neutzler | 429/26 |
| 5,981,098 | 11/1999 | Vitale | 429/34 |

FOREIGN PATENT DOCUMENTS

WO 96/12316  4/1996  WIPO.

OTHER PUBLICATIONS

Chilton's Product Design & Development, Jun. 1997.

*Primary Examiner*—Stephen Kalafut
*Assistant Examiner*—Jonathan Crepeau
*Attorney, Agent, or Firm*—Lawrence B. Plant

[57] ABSTRACT

A PEM fuel cell having serpentine flow field channels wherein the input/inlet legs of each channel border the input/inlet legs of the next adjacent channels in the same flow field, and the output/exit legs of each channel border the output/exit legs of the next adjacent channels in the same flow field. The serpentine fuel flow channels may be longer, and may contain more medial legs, than the serpentine oxidant flow channels.

3 Claims, 5 Drawing Sheets

MIRRORED SERPENTINE FLOW CHANNELS FOR FUEL CELL

This application is a continuation-in-part of U.S. patent application Ser. No. 08/990,642, now abandoned, entitled "Mirrored Serpentine Flow Channels for Fuel Cells" filed in the name of Jeffrey Allan Rock on Dec. 15, 1997 and assigned to the assignee of the present invention.

The Government of the United States of America has rights in this invention pursuant to Contract No. DE-AC02-90CH10435 awarded by the United States Department of Energy.

TECHNICAL FIELD

This invention relates to PEM fuel cells and more particularly to the reactant flow fields therefor.

BACKGROUND OF THE INVENTION

Fuel cells have been proposed as a power source for many applications. One such fuel cell is the PEM (i.e., proton exchange membrane) fuel cell. PEM fuel cells are well known in the art and include in each cell thereof a so-called "membrane-electrode-assembly" (hereafter MEA) comprising a thin (i.e., ca. 0.0015–0.007 inch), proton-conductive, polymeric, membrane-electrolyte having an anode electrode film (i.e., ca. 0.002 inch) formed on one face thereof, and a cathode electrode film (i.e., ca. 0.002 inch) formed on the opposite face thereof. Such membrane-electrolytes are well known in the art and are described in such as U.S. Pat. No. 5,272,017 and 3,134,697, as well as in the Journal of Power Sources, Volume 29 (1990) pages 367–387, inter alia. In general, such membrane-electrolytes are made from ion-exchange resins, and typically comprise a perfluoronated sulfonic acid polymer such as NAFION™ available from the E.I. DuPont de Nemeours & Co. The anode and cathode films, on the other hand, typically comprise (1) finely divided carbon particles, very finely divided catalytic particles supported on the internal and external surfaces of the carbon particles, and proton conductive material (e.g., NAFION™) intermingled with the catalytic and carbon particles, or (2) catalytic particles, sans carbon, dispersed throughout a polytetrafluoroethylene (PTFE) binder. One such MEA and fuel cell is described in U.S. Pat. No. 5,272,017 issued Dec. 21, 1993, and assigned to the assignee of the present invention.

The MEA is sandwiched between sheets of porous, gas-permeable, conductive material which press against the anode and cathode faces of the MEA and serve as (1) the primary current collectors for the anode and cathode, and (2) mechanical support for the MEA. Suitable such primary current collector sheets comprise carbon or graphite paper or cloth, fine mesh noble metal screen, and the like, as is well known in the art.

The thusly formed sandwich is pressed between a pair of electrically conductive plates which serve as secondary current collectors for collecting the current from the primary current collectors and conducting current between adjacent cells (i.e., in the case of bipolar plates) internally of the stack, and externally of the stack in the case of monopolar plates at the ends of the stack. The secondary current collecting plates each contain at least one so-called "flow field" that distributes the fuel cell's gaseous reactants (e.g., $H_2$ and $O_2$/air) over the surfaces of the anode and cathode. The flow field includes a plurality of lands which engage the primary current collector and define therebetween a plurality of flow channels through which the gaseous reactants flow between a supply manifold at one end of the channel and an exhaust manifold at the other end of the channel. Serpentine flow channels are known and connect the supply and exhaust manifolds only after having made a number of hairpin turns and switch backs such that each leg of the serpentine flow channel borders at least one other leg of the same serpentine flow channel (see U.S. Pat. No. 5,108,849). Serpentine channels are advantageous in that they permit gas flow between adjacent legs of the same channel even when the flow channel is blocked (e.g., by a water droplet). In this regard, gas can flow from a portion of the channel which is upstream of the blockage where gas pressure is high, to a portion of the channel downstream of the blockage where gas pressure is low by flowing through the porous primary current collector over the land that separates a highly pressurized leg portion from a lowly pressurized leg portion of the next adjacent flow channel.

Prior art serpentine channels have heretofore promoted the loss of the gaseous reactants by locating the inlet leg of one serpentine flow channel adjacent the outlet leg of the next adjacent serpentine flow channel (see FIG. 4). Such an arrangement allowed reactants from the inlet leg (which is at relatively high pressure) of one flow channel to flow over the intervening land into the outlet leg (which is at relatively low pressure) of the next adjacent channel without traversing the entire length of the flow channel. In other words, some of the gas can short-circuit or bypass its intended flow channel and not be consumed in the fuel cell reaction.

SUMMARY OF THE INVENTION

The present invention overcomes the aforesaid problem by arranging serpentine flow channels in a mirror-image fashion. More specifically, the present invention involves a PEM fuel cell including (1) a proton exchange membrane having cathode and anode faces on opposite sides of the membrane, (2) gas permeable, electrically conductive primary current collectors each engaging an anode or cathode face, and (3) a secondary, current-collecting plate engaging at least one of the gas permeable primary current collectors and defining a gas flow field confronting the gas permeable current collector. The flow field defined by the current-collecting plate includes a plurality of lands that engage the primary current collector and define a plurality of serpentine gas flow channels each of which has (a) an inlet leg for receiving gas from a supply manifold common to all the gas flow channels in the flow field, (b) an exit leg for discharging unreacted gas into an exhaust manifold common to the flow channels in the flow field, and (c) at least one medial leg intermediate the inlet and exit legs. Each of the legs for any given channel borders at least one (preferably more) other leg of the same channel. In accordance with the present invention, the inlet leg of one flow channel borders the inlet leg of a first next adjacent flow channel in the same flow field, and the exit leg of the one flow channel borders the exit leg of a second next-adjacent flow channel in the same flow field. As a result, gas entering the inlet leg of a first channel from the supply manifold cannot bypass or short-circuit the remaining legs of the first flow channel by short-circuiting to the exhaust manifold via the exit leg of a next adjacent flow channel because the inlet and exit legs of adjacent flow channels are coupled to their respective supply and exhaust manifolds next to each other. Accordingly, adjacent inlet legs are at substantially the same pressure and adjacent outlet legs are at substantially the same pressure which prevents gas from moving directly from the inlet end of one channel to the outlet end of the next adjacent channel. Preferably, the serpentine flow channels for a given flow field (e.g., anode) will all have the same flow length between inlet and exit manifolds, and each channel will be the mirror image of the next-adjacent channel. Most preferably, the serpentine flow channels that make up the anode flow field will have more medial legs (e.g., 3) and a longer length than the flow channels that make up the cathode flow field (e.g., 1 medial leg). Preferably, both the anode and cathode flow fields will utilize serpentine, mirrored flow channels configured and arranged such that lands defining the anode flow field will directly oppose lands defining the cathode flow field so as to pinch the MEA between opposing lands along the full length of the opposing lands. Alternatively, the opposing lands will extend transverse each other (e.g., 90°) and pinch the MEA at a plurality of point contacts where the opposing lands intersect.

BRIEF DESCRIPTION OF THE DRAWINGS

The invention will be better understood when considered in the light of the following detailed description of a specific embodiment thereof which is given hereafter in conjunction with the several figures in which.

DESCRIPTION OF THE PREFERRED EMBODIMENT

Figure 1:
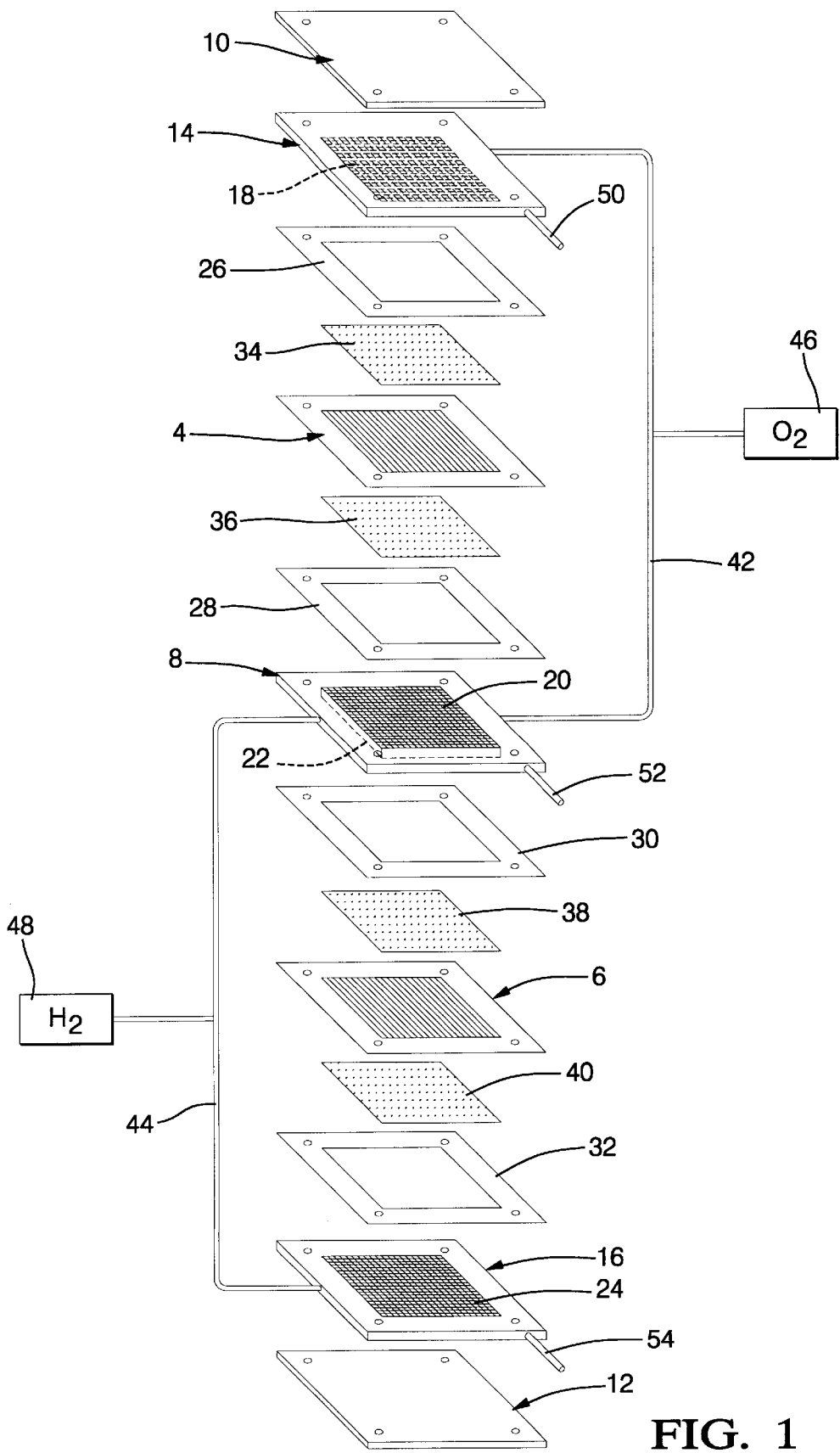
FIG. 1 is a schematic, isometric, exploded illustration of a PEM fuel cell.

FIG. 1 depicts a two cell, bipolar, PEM fuel cell stack having a pair of membrane-electrode-assemblies (MEAs) 4 and 6 separated from each other by an electrically conductive, liquid-cooled, bipolar plate 8. The MEAs 4 and 6, and bipolar plate 8, are stacked together between stainless steel clamping plates 10 and 12, and monopolar end contact plates 14 and 16. The monopolar end contact plates 14 and 16, as well as the bipolar plate 8, each contain flow fields 18, 20, 22 and 24 comprising a plurality of channels formed in the faces of the plates for distributing fuel and oxidant gases (i.e., $H_2$ & $O_2$) to the anode and cathode faces of the MEAs 4 and 6. Nonconductive gaskets 26, 28, 30, and 32 provide seals and electrical insulation between the several plates of the fuel cell stack. Porous, gas permeable, electrically conductive sheets 34, 36, 38 and 40 press up against the electrode faces of the MEAs 4 and 6 and serve as primary current collectors for the electrodes as well as mechanical supports for the MEAs, especially at locations where the MEAs 4 and 6 span flow channels in the flow field and are otherwise unsupported. Suitable primary current collectors include carbon/graphite paper/cloth, fine mesh noble metal screens, open cell noble metal foams, and the like which conduct current from the electrodes while allowing gas to pass therethrough to reset on the electrodes. The end contact elements 14 and 16 press up against the primary current collectors 34 and 40 respectively, while the bipolar plate 8 presses up against the primary current collector 36 on the anode face of MEA 4, and against the primary current collector 38 on the cathode face of MEA 6. Oxygen is supplied to the cathode side of the fuel cell stack from a storage tank 46 via appropriate supply plumbing 42, while hydrogen is supplied to the anode side of the fuel cell from a storage tank 48, via appropriate supply plumbing 44. Preferably, the $O_2$ tank 46 is eliminated and air is supplied to the cathode side from the ambient. Preferably the $H_2$ tank 48 is eliminated and hydrogen supplied to the anode from a reformer which catalytically generates hydrogen from methanol or a liquid hydrocarbon (e.g., gasoline). Exhaust plumbing (not shown) for both the $H_2$ and $O_2$/air sides of the MEAs is also be provided for removing $H_2$-depleted anode gas from the anode flow field and $O_2$-depleted cathode gas from the cathode flow field. Additional plumbing 50, 52 and 54 is provided for supplying liquid coolant to the bipolar plate 8 and end plates 14 and 16, as may be needed. Appropriate plumbing for exhausting coolant from the plate 8 and end plates 14 and 16 is also provided, but not shown.

Figure 2:
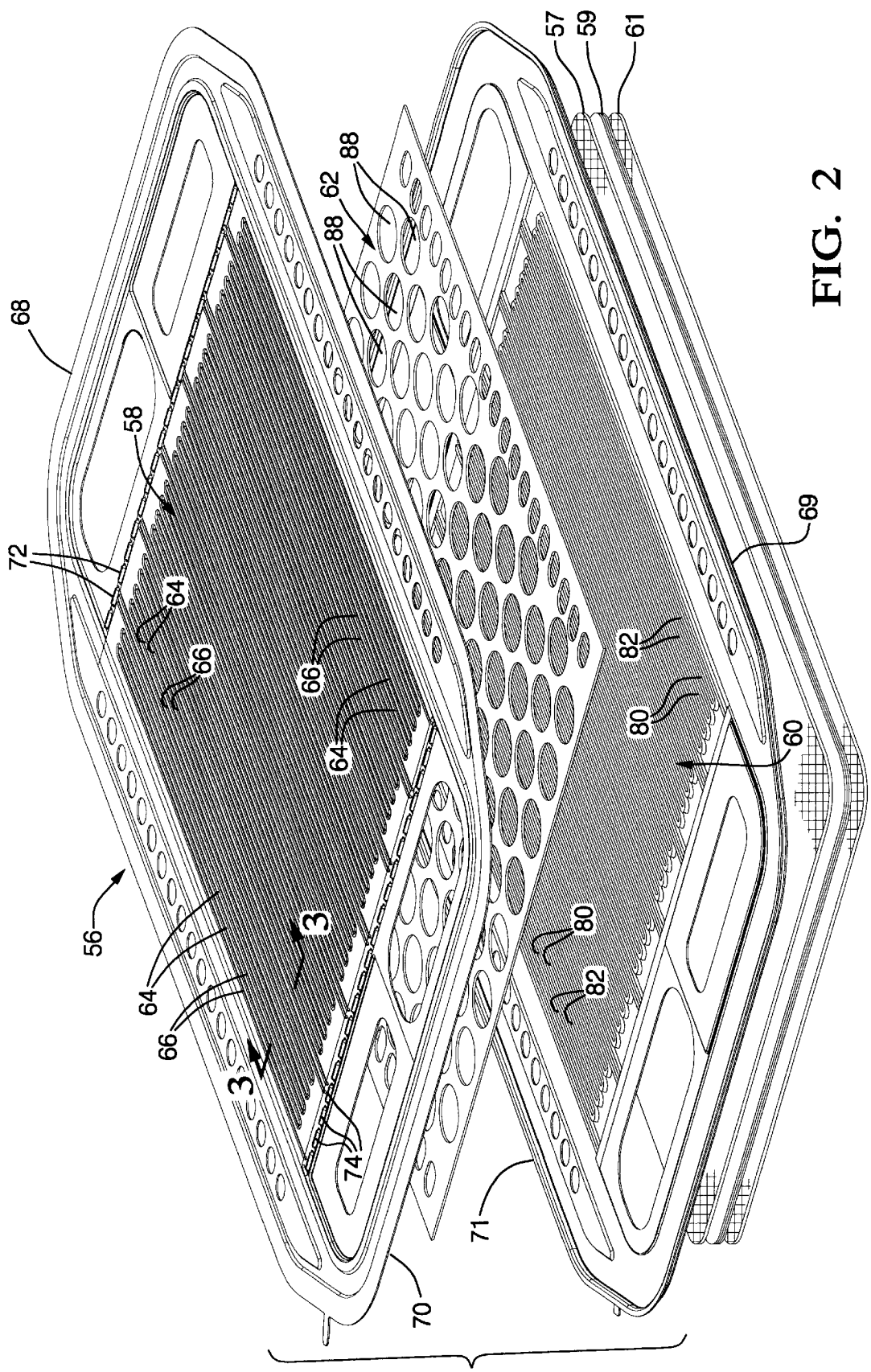
FIG. 2 is an isometric, exploded view of an MEA and bipolar plate in a fuel cell stack.
Figure 3:
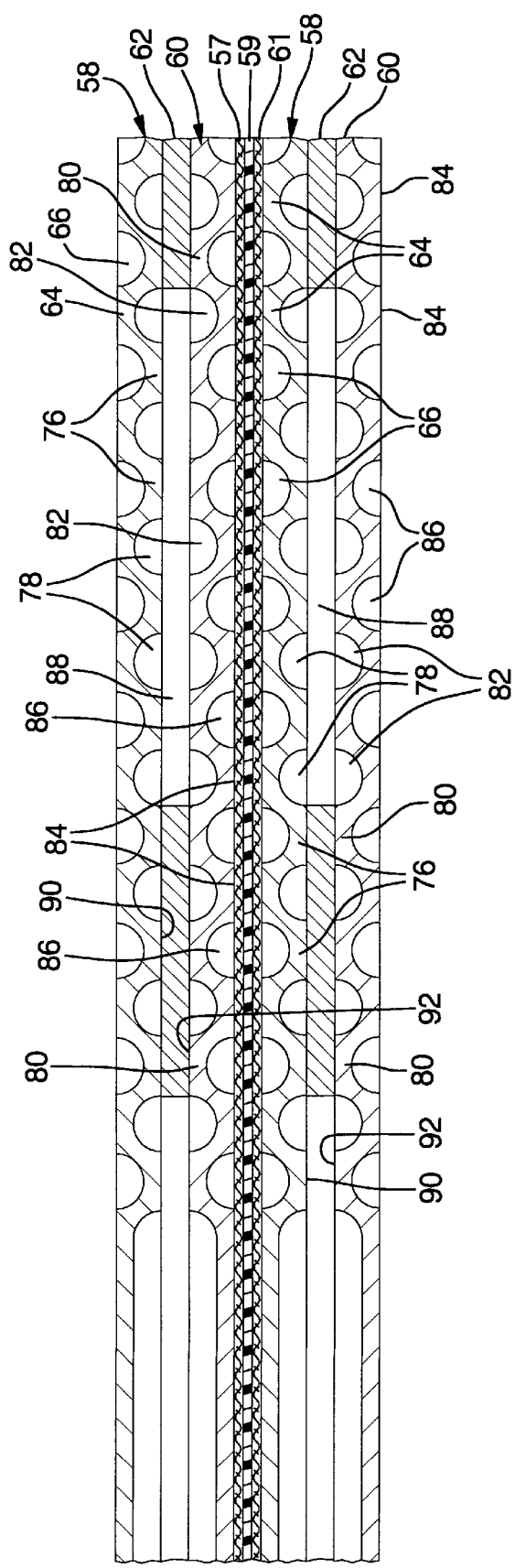
FIG. 3 is a sectioned view in the direction 3—3 of FIG. 2, after assembly.

FIG. 2 is an isometric, exploded view of a bipolar plate 56, first primary porous current collector 57, MEA 59 and second primary porous current collector 61 as they are stacked together in a fuel cell. A second bipolar plate (not shown) would underlie the second primary current collector 61 to form one complete cell. Similarly, another set of primary current collectors and MEA (not shown) will overlie the upper sheet 58. The bipolar plate 56 comprises a first exterior metal sheet 58, a second exterior metal sheet 60, and an interior spacer metal sheet 62 which is brazed interjacent the first metal sheet 58 and the second metal sheet 60. The metal sheets 58, 60 and 62 are made as thin as possible (e.g., about 0.002–0.02 inches thick), may be formed by stamping, by photo etching (i.e., through a photolithographic mask) or any other conventional process for shaping sheet metal. The external sheet 58 is formed so as to provide a reactant gas flow field characterized by a plurality of lands 64 which define therebetween a plurality of serpentine gas flow channels 66 through which the fuel cell's reactant gases (i.e., $H_2$ or $O_2$) flow in a tortuous path from near one edge 68 of the bipolar plate to near the opposite edge 70 thereof. When the fuel cell is fully assembled, the lands 64 would press against the primary current collectors 61 (see FIG. 3) which, in turn, press against the MEA 59. In operation, current flows from the primary current collector through the lands 64 and thence through the stack. The reactant gas is supplied to channels 66 from a header or supply manifold groove 72 that lies adjacent the edge 68 of the fuel cell, and exits the channels 66 via an exhaust manifold groove 74 that lies adjacent the opposite edge 70 of the fuel cell. As best shown in FIG. 3, the underside of the metal sheet 58 includes a plurality of ridges 76 which define therebetween a plurality of grooves 78 through which coolant passes during the operation of the fuel cell.

Metal sheet 60 is similar to sheet 58. The internal (i.e., coolant side) of sheet 60 is shown in FIG. 2. In this regard, there is depicted the backside of the flow field characterized by a plurality of ridges 80 defining therebetween a plurality of grooves 82 through which coolant flows from one edge 69 of the bipolar plate to the opposite edge 71. Like sheet 58, and as best shown in FIG. 3, the external side of the sheet 60 will have a plurality of lands 84 thereon defining a plurality of channels 86 through which the reactant gases pass. An interior metal spacer sheet 62 is interjacent the exterior sheets 58 and 60 and includes a plurality of apertures 88 therein to permit coolant to flow between the channels 82 in sheet 60 and the channels 78 in the sheet 58 thereby breaking laminar boundary layers and affording turbulence, and hence more effective heat exchange with the inside faces 90 and 92 of the exterior sheets 58 and 60 respectively. The several sheets 58, 60 and 62 are preferably brazed together.

Figure 4:
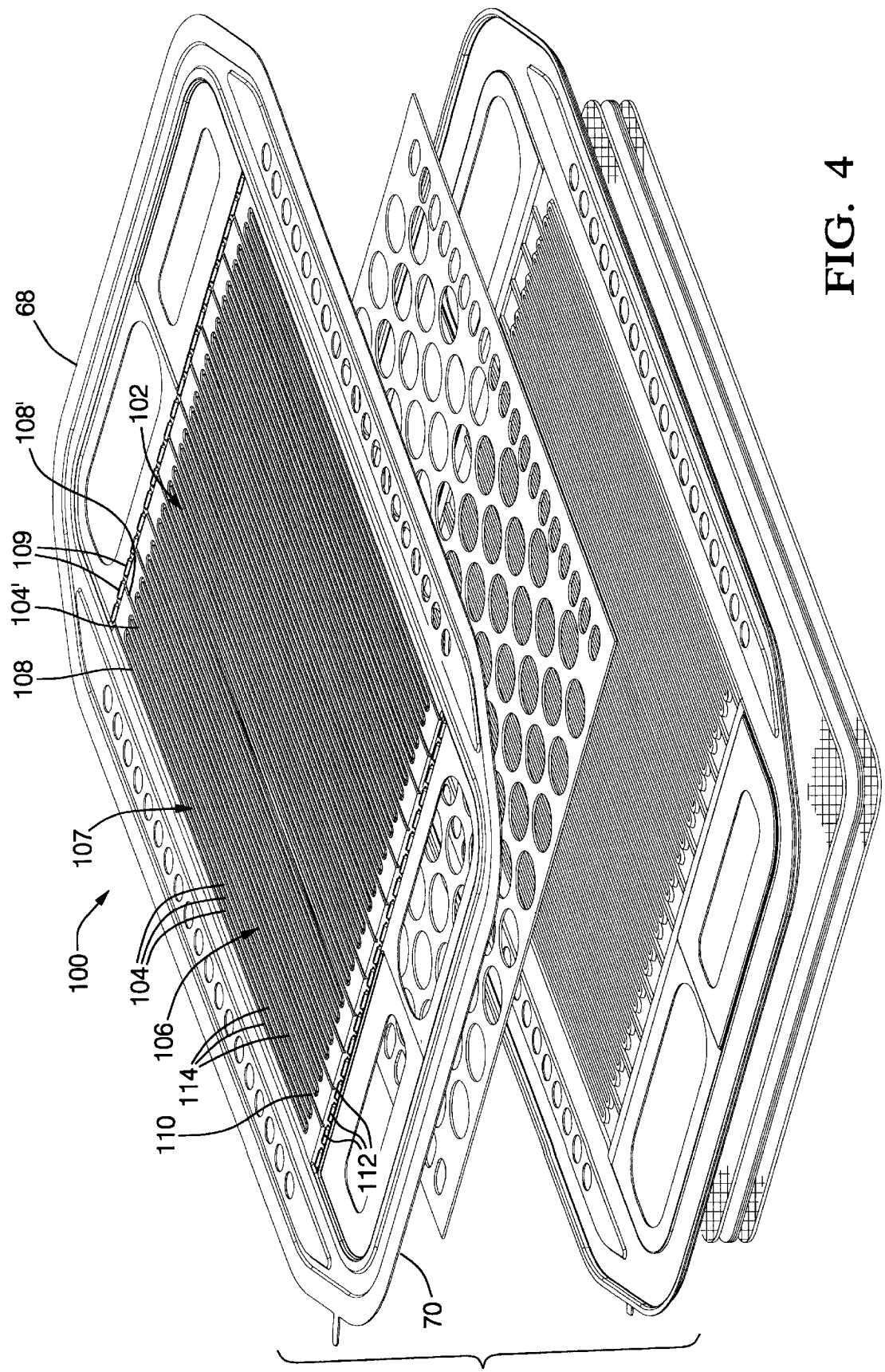
FIG. 4 is a view like FIG. 2 showing a prior art flow field having serpentine flow channels.
Figure 5:
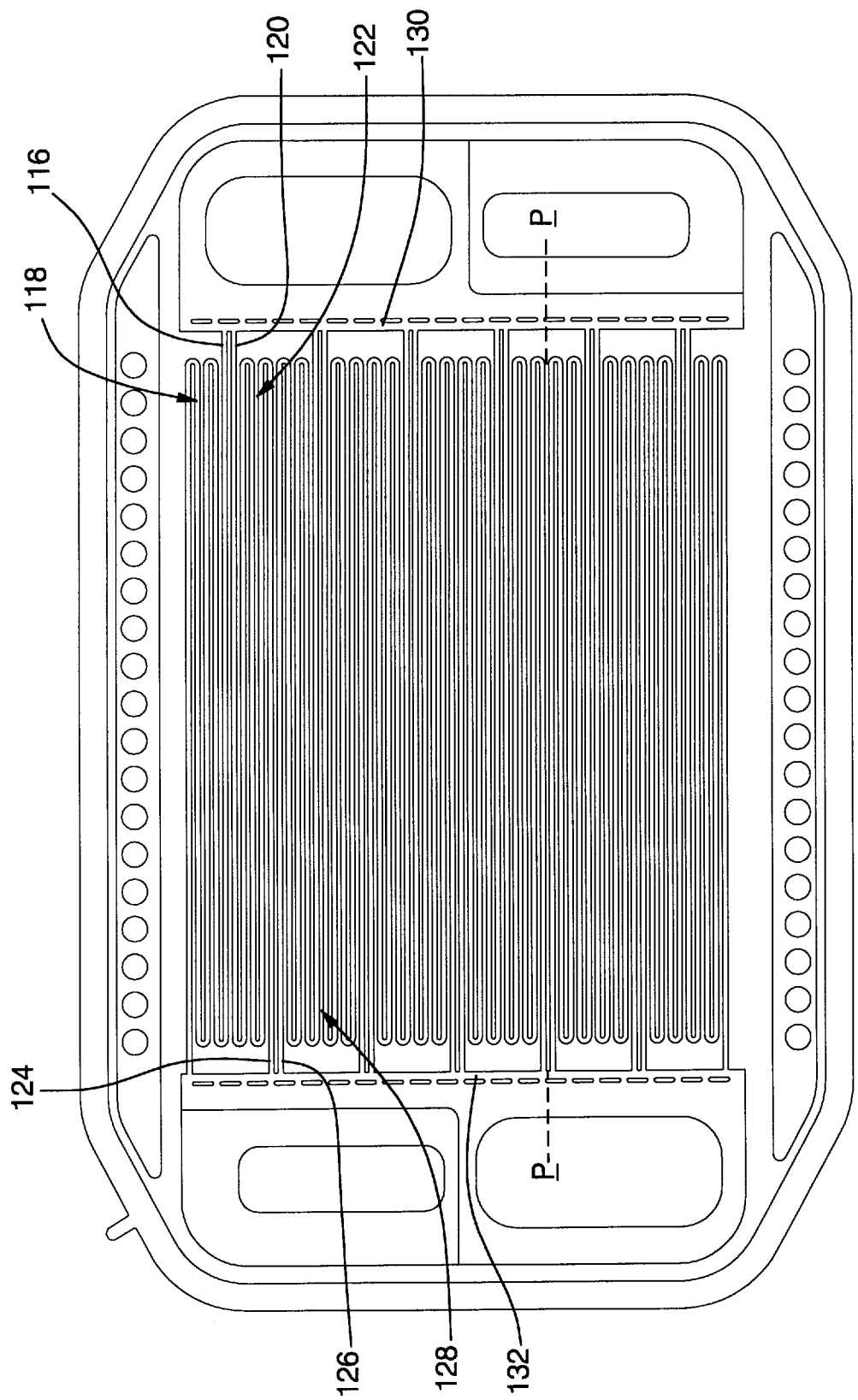
FIG. 5 is an enlarged view of a flow field having mirrored flow channels in accordance with the present invention.

To better understand the invention, reference is made to FIGS. 4 and 5. FIG. 4 depicts a bipolar plate 100 having a prior art flow field 102 comprising a plurality of lands 104 defining a plurality of serpentine flow channels 106. Each serpentine flow channel 106 comprises (1) an inlet or input leg 108 that receives reactant gas (i.e., oxidant or fuel) from a gas supply manifold 109 common to all of the flow channels 106, (2) an exit or outlet leg 110 that discharges unreacted reactant gas into an exhaust manifold 112 common to all of the flow channels 106, and (3) at least one (preferably three) medial legs 114 intermediate the input/inlet leg 108 and the exit/outlet leg 110. As can be seen, the inlet/input leg 108' of one flow channel 106 borders the exit/output leg 110 of the next-adjacent flow channel 107. As result, gas from the inlet/input leg 108' which is at relatively high pressure $P_1$, provided by the supply manifold 109, can pass over the intervening land 104' through the porous primary current collector into the exit leg 110 of the next adjacent flow channel 107. Contrastingly, as shown in FIG. 5 and in accordance with the present invention, the input/inlet leg 116 of one flow channel 118 borders the input/inlet leg 120 of the next-adjacent flow channel 122, and the exit/outlet leg 124 of one flow channel 122 is contiguous or borders the exit/outlet leg 126 of the next adjacent flow channel 128. Hence, the inlet/input legs of adjacent channels are contiguous to each other at the supply manifold 130, and the exit/outlet legs of the adjacent channels are contiguous to each other at the exhaust manifold 132. Effectively each flow channel is a mirror image of the next-adjacent flow channel when viewed in a plane P therebetween.

When the inlet/input leg 108' of one flow channel 106 is adjacent the exit/outlet leg 110 of the next adjacent flow channel 107, as occurs in prior art flow fields (see FIG. 4), leakage of gas can occur from the inlet leg 108' directly into the exit/outlet leg 110 without passing through the rest of the flow channel. In this regard, the gas in inlet/input leg 108' of flow channel 106 is at a pressure $P_1$ near that of the supply manifold 109 which is higher than the pressure $P_2$ in the exit/outlet leg 110 of the flow channel 107 which is near that of the exhaust manifold 112. The pressure drop, $\Delta P$ ($P_2-P_1$), across the land 104' separating the inlet/input leg 108' from the exit/output leg 110 is sufficient to cause gas in the inlet/input leg 108' to migrate through the porous primary current collector between the land 104' and the MEA into the exit/output leg 110 and hence be shunted non-usefully directly into the exhaust manifold 112. Because there is no pressure drop between adjacent inlet/input legs (e.g., 116 and 120 in FIG. 5), no leakage from one to the other can occur under normal operating conditions, and would only occur if one of the mutually bordering input/inlet legs experiences a blockage (e.g., a water droplet lodged in the flow channel).

While the invention has been disclosed in terms on one specific embodiment thereof, it is not intended that it be limited thereto but rather only to the extent set forth hereafter in the claims which follow.

What is claimed is:

1. In a PEM fuel cell comprising (1) a proton exchange membrane having opposing cathode and anode faces on opposite sides of said membrane, (2) a gas permeable electrically conductive cathode current collector engaging said cathode face, (3) a gas permeable electrically conductive anode current collector engaging said anode face, and (4) a current-collecting plate engaging at least one of said gas permeable cathode and anode current collectors and defining a gas flow field confronting said one gas permeable current collector, said flow field comprising a plurality of lands engaging said one current collector and defining a plurality of serpentine gas flow channels, each of said channels having (a) an inlet leg for receiving gas from a supply manifold common to all said flow channels, (b) an exit leg for discharging said gas into an exhaust manifold common to all said flow channels, and (c) at least one medial leg intermediate said inlet and exit legs, said inlet, exit and medial legs for each channel bordering at least one other leg of the same channel, the improvement wherein the inlet leg of one flow channel borders the inlet leg of a first next adjacent flow channel in said flow field for substantially the entire length of said inlet legs, and the exit leg of said one flow channel borders the exit leg of a second next adjacent flow channel in said flow field for substantially the entire length of said exit legs whereby bordering inlet legs are at substantially the same pressure along their lengths and bordering exit legs are at substantially the same pressure along their length so as to prevent short-circuiting of gas from one of said flow channels to the next adjacent flow channel.

2. In a PEM fuel cell comprising (1) a proton exchange membrane having opposing cathode and anode faces on opposite sides of said membrane, (2) a gas permeable electrically conductive cathode current collector engaging said cathode face, (3) a gas permeable electrically conductive anode current collector engaging said anode face, (4) a cathode current-collecting plate engaging said gas permeable cathode current collector and defining an oxidant flow field confronting said gas permeable cathode current collector, said oxidant flow field comprising a plurality of lands engaging said cathode current collector and defining a plurality of serpentine oxidant flow channels, each of said oxidant flow channels having (a) an inlet leg for receiving oxidant from a cathode supply manifold common to said oxidant flow channels, (b) an exit leg for discharging oxidant into a cathode exhaust manifold common to said oxidant flow channels, and (c) at least one medial leg intermediate said inlet and exit legs, said inlet, exit and medial legs for each said oxidant flow channel bordering at least one other leg of the same oxidant flow channel, and (5) an anode current-collecting plate engaging said gas permeable anode current collector and defining a fuel flow field confronting said gas permeable anode current collector, said fuel flow field comprising a plurality of lands engaging said anode current collector and defining a plurality of serpentine fuel flow channels, each of said fuel flow channels having (x) an input leg for receiving fuel from an anode supply manifold common to said fuel flow channels, (y) an outlet leg for discharging unreacted fuel into an anode exhaust manifold common to said fuel flow channels, and (z) at least one medial leg intermediate said input and outlet legs, said input, outlet and medial legs for each said fuel flow channel bordering at least one other leg of the same fuel flow channel, the improvement wherein (a) the input leg of one fuel flow channel is contiguous the input leg of a first next adjacent fuel flow channel for substantially the entire lengths of said input legs, and the outlet leg of said one fuel flow channel is contiguous the outlet leg of a second next adjacent fuel flow channel for substantially the entire lengths of said outlet legs whereby fuel entering the input leg of one channel from said anode supply channel is prevented from bypassing said one channel and short-circuiting to said anode exhaust manifold via the outlet leg of a next adjacent fuel flow channel, and (b) the inlet leg of one oxidant flow channel borders the inlet leg of a first next adjacent oxidant flow channel for substantially the entire lengths of said inlet legs, and the exit leg of said one oxidant flow channel borders the exit leg of a second next adjacent oxidant flow channel for substantially the entire lengths of said contiguous exit legs whereby oxidant entering the inlet leg of a first channel from said cathode supply manifold is prevented from bypassing said first channel and short-circuiting to said cathode exhaust manifold via the exit leg of a next adjacent oxidant flow channel.

3. A fuel cell according to claim 2 wherein said serpentine fuel flow channels are longer, and contain more medial legs, than said serpentine oxidant flow channels.

* * * * *